(12) United States Patent
Zhu et al.

(10) Patent No.: US 10,944,490 B2
(45) Date of Patent: Mar. 9, 2021

(54) ANTENNA CALIBRATION FOR MULTIPLE INPUT MULTIPLE OUTPUT

(71) Applicant: Telefonaktiebolaget LM Ericsson (publ), Stockholm (SE)

(72) Inventors: Huaisong Zhu, Beijing (CN); Jianfeng Wang, Beijing (CN); Qianxi Lu, Beijing (CN); Zhan Zhang, Beijing (CN)

(73) Assignee: Telefonsktiebolsget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/467,152

(22) PCT Filed: Dec. 23, 2016

(86) PCT No.: PCT/CN2016/111696
§ 371 (c)(1),
(2) Date: Jun. 6, 2019

(87) PCT Pub. No.: WO2018/112879
PCT Pub. Date: Jun. 28, 2018

(65) Prior Publication Data
US 2020/0076517 A1    Mar. 5, 2020

(51) Int. Cl.
*H04B 17/21* (2015.01)
*H04B 17/12* (2015.01)
(Continued)

(52) U.S. Cl.
CPC .............. *H04B 17/21* (2015.01); *H01Q 3/267* (2013.01); *H04B 17/12* (2015.01); *H04B 17/14* (2015.01); *H04B 17/309* (2015.01)

(58) Field of Classification Search
CPC ........ H04B 17/21; H04B 17/12; H04B 17/14; H04B 17/309; H04B 7/2121;
(Continued)

(56) References Cited

U.S. PATENT DOCUMENTS

| | | | | |
|---|---|---|---|---|
| 5,936,569 A * | 8/1999 | St.ang.hle | ............ | H04B 7/0615 342/174 |
| 6,624,784 B1 * | 9/2003 | Yamaguchi | .......... | H01Q 3/2605 342/372 |

(Continued)

FOREIGN PATENT DOCUMENTS

| | | |
|---|---|---|
| CN | 101682432 A | 3/2010 |
| CN | 103229354 A | 7/2013 |

(Continued)

OTHER PUBLICATIONS

Joshi, Kiran, Steven Hong, and Sachin Katti. "Pinpoint: Localizing interfering radios." Presented as part of the 10th {USENIX} Symposium on Networked Systems Design and Implementation ({NSDI} 13). 2013. (Year: 2013).*

(Continued)

*Primary Examiner* — Sharad Rampuria
(74) *Attorney, Agent, or Firm* — Patent Portfolio Builders, PLLC (57) ABSTRACT

A method for antenna calibration is proposed. The method may comprise setting a first control unit to a first operation mode. The first control unit may be located on a first antenna path of a first antenna array which has a plurality of antennas. Under the first operation mode of the first control unit, a calibration signal for the first antenna path can be isolated from interference. The method may further comprise obtaining a measurement based at least partly on the calibration signal for the first antenna path. The method may further comprise performing antenna calibration for the plurality of antennas of the first antenna array based at least partly on the obtained measurement.

15 Claims, 7 Drawing Sheets

(51) Int. Cl.
*H04B 17/14* (2015.01)
*H04B 17/309* (2015.01)
*H01Q 3/26* (2006.01)

(58) Field of Classification Search
CPC ........ H04B 7/2123; H04B 17/19; H04B 7/02;
H01Q 3/267; H04J 2203/0069; H04Q
2213/394; H04W 72/04; H04W 72/12;
H04W 76/00
See application file for complete search history.

(56) References Cited

U.S. PATENT DOCUMENTS

| | | | |
|---|---|---|---|
| 2009/0191819 A1 | 7/2009 | Chae et al. | |
| 2013/0260844 A1* | 10/2013 | Rucki | H04M 1/026 455/575.7 |
| 2017/0222739 A1* | 8/2017 | Su | H04B 17/21 |

FOREIGN PATENT DOCUMENTS

| | | |
|---|---|---|
| GB | 2346013 A | 7/2000 |
| GB | 2467773 A | 8/2010 |
| WO | 2014040250 A1 | 3/2014 |
| WO | 2014169934 A1 | 10/2014 |

OTHER PUBLICATIONS

International Search Report and Written Opinion for International Patent Application No. PCT/CN2016/111696, dated Jul. 28, 2017, 12 pages.

European Search Report issued in corresponding EP Application No. 16924670.9 dated Nov. 18, 2019, 09 Pages.

European Office Action issued in corresponding EP Application No. 16924670.9 dated Sep. 28, 2020, 05 Pages.

* cited by examiner

ANTENNA CALIBRATION FOR MULTIPLE INPUT MULTIPLE OUTPUT

This application is a 35 U.S.C. § 371 national phase filing of International Application No. PCT/CN2016/111696, filed Dec. 23, 2016, the disclosure of which is incorporated herein by reference in its entirety.

FIELD OF THE INVENTION

The present disclosure generally relates to communications, and more specifically, relates to wireless communications.

BACKGROUND

Communication service providers and device manufacturers have been continually facing challenges to deliver value and convenience to consumers by, for example, providing compelling network services and performances. To meet dramatically increasing traffic requirements, one interesting option for communication technique development is to move to new frequency bands which have large amounts of spectrum. Particular bands of interest are the millimeter Wave (mm Wave) bands of 20-90 GHz. In such high carrier frequency, beam-forming techniques are attractive to obtain high beam-forming gains with multiple or massive antennas. However, to generate a beam as expected, it is necessary to calibrate the antennas, for example, in terms of amplitude, time and phase. Especially in a time division duplex (TDD) mode, well calibrated antennas would be desirable to explore the reciprocity.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

The present disclosure proposes a solution for antenna calibration, which may be applicable to a multiple input multiple output (MIMO) system to avoid the unexpected interference and improve accuracy of the antenna calibration. Alternatively or additionally, the proposed solution may also be utilized to remove the residual calibration error between antenna arrays or panels.

According to a first aspect of the present disclosure, there is provided a method for antenna calibration which may be performed at an apparatus such as a user terminal or a network node. The method may comprise setting a first control unit to a first operation mode. The first control unit may be located on a first antenna path of a first antenna array which has a plurality of antennas. Under the first operation mode of the first control unit, a calibration signal for the first antenna path can be isolated from interference. The method may further comprise obtaining a measurement based at least partly on the calibration signal for the first antenna path. Based at least partly on the obtained measurement, antenna calibration may be performed for the plurality of antennas of the first antenna array.

In an exemplary embodiment, the method according to the first aspect of the present disclosure may further comprise setting a second control unit to the first operation mode. The second control unit may be located on a second antenna path of the first antenna array, and under the first operation mode of the second control unit, a calibration signal for the second antenna path can be isolated from interference.

In an exemplary embodiment, the obtained measurement may comprise at least: a measurement of the calibration signal for the first antenna path coupled back to the first antenna path, and a measurement of the calibration signal for the second antenna path coupled back to the second antenna path.

Optionally, the first antenna array may be coupled to a second antenna array having a plurality of antennas which have been calibrated. In an exemplary embodiment where the first control unit is under the first operation mode, the method according to the first aspect of the present disclosure may further comprise obtaining a measurement of the calibration signal for the first antenna path respectively coupled back to a second antenna path of the first antenna array, third and fourth antenna paths of the second antenna array. Thus, antenna calibration between the first and second antenna arrays may be performed based at least partly on the obtained measurement.

According to a second aspect of the present disclosure, there is provided an apparatus for antenna calibration. The apparatus may comprise at least one processor and at least one memory comprising computer program code. The at least one memory and the computer program code may be configured to, with the at least one processor, cause the apparatus at least to perform any step of the method according to the first aspect of the present disclosure.

According to a third aspect of the present disclosure, there is provided a computer program product comprising a computer-readable medium bearing computer program codes embodied therein for use with a computer. The computer program codes may comprise code for performing any step of the method according to the first aspect of the present disclosure.

According to a fourth aspect of the present disclosure, there is provided an apparatus for antenna calibration. The apparatus may comprise a setting module, an obtaining module and a performing module. In accordance with some exemplary embodiments, the setting module may be operable to carry out at least the setting step of the method according to the first aspect of the present disclosure. The obtaining module may be operable to carry out at least the obtaining step of the method according to the first aspect of the present disclosure. The performing module may be operable to carry out at least the performing step of the method according to the first aspect of the present disclosure.

According to a fifth aspect of the present disclosure, there is provided an antenna apparatus comprising a first antenna array and a first control unit. The first antenna array have a plurality of antenna paths and the first control unit is located on a first antenna path of the first antenna array to control calibration interference. Under a first operation mode of the first control unit, a calibration signal for the first antenna path can be isolated from interference.

According to a sixth aspect of the present disclosure, there is provided a method for antenna calibration which may be performed at an apparatus such as a user terminal or a network node. The method may comprise setting first and third control units to a first operation mode. The first control unit may be located on a first antenna path of a first antenna array having a plurality of antennas which have been calibrated. Under the first operation mode of the first control unit, a calibration signal for the first antenna path can be isolated from interference. The first antenna array is coupled to a second antenna array having a plurality of antennas which have been calibrated. The third control unit may be located on a third antenna path of the second antenna array, and under the first operation mode of the third control unit, a calibration signal for the third antenna path can be isolated from interference.

The method according to the sixth aspect of the present disclosure may further comprise obtaining a measurement based at least partly on the calibration signal for the first antenna path and the calibration signal for the third antenna path. Accordingly, antenna calibration between the first and second antenna arrays may be performed based at least partly on the obtained measurement.

In an exemplary embodiment, at least one of the calibration of the plurality of antennas of the first antenna array and the calibration of the plurality of antennas of the second antenna array may be based at least partly on antenna calibration with a coupler network.

In an exemplary embodiment, the obtained measurement may comprise at least: a measurement of the calibration signal for the first antenna path respectively coupled back to a second antenna path of the first antenna array, the third antenna path and a fourth antenna path of the second antenna array; and a measurement of the calibration signal for the third antenna path respectively coupled back to the first and second antenna paths of the first antenna array, and the fourth antenna path of the second antenna array.

Optionally, the method according to the sixth aspect of the present disclosure may further comprise setting a second control unit to the first operation mode in response to a failure of the first antenna path. The second control unit is located on a second antenna path of the first antenna array, and under the first operation mode of the second control unit, a calibration signal for the second antenna path can be isolated from interference.

Optionally, the method according to the sixth aspect of the present disclosure may further comprise obtaining a measurement of the calibration signal for the second antenna path respectively coupled back to the first antenna path of the first antenna array, the third and a fourth antenna paths of the second antenna array; and performing antenna calibration between the first and second antenna arrays based at least partly on the obtained measurement.

Optionally, the method according to the sixth aspect of the present disclosure may further comprise: setting a fourth control unit to the first operation mode in response to a failure of the third antenna path. The fourth control unit is located on a fourth antenna path of the second antenna array, and under the first operation mode of the fourth control unit, a calibration signal for the fourth antenna path can be isolated from interference.

Optionally, the method according to the sixth aspect of the present disclosure may further comprise: obtaining a measurement of the calibration signal for the fourth antenna path respectively coupled back to the third antenna path of the second antenna array, the first and a second antenna paths of the first antenna array; and performing antenna calibration between the first and second antenna arrays based at least partly on the obtained measurement.

According to a seventh aspect of the present disclosure, there is provided an apparatus for antenna calibration. The apparatus may comprise at least one processor and at least one memory comprising computer program code. The at least one memory and the computer program code may be configured to, with the at least one processor, cause the apparatus at least to perform any step of the method according to the sixth aspect of the present disclosure.

According to an eighth aspect of the present disclosure, there is provided a computer program product comprising a computer-readable medium bearing computer program codes embodied therein for use with a computer. The computer program codes may comprise code for performing any step of the method according to the sixth aspect of the present disclosure.

According to a ninth aspect of the present disclosure, there is provided an apparatus for antenna calibration. The apparatus may comprise a setting module, an obtaining module and a performing module. In accordance with some exemplary embodiments, the setting module may be operable to carry out at least the setting step of the method according to the sixth aspect of the present disclosure. The obtaining module may be operable to carry out at least the obtaining step of the method according to the sixth aspect of the present disclosure. The performing module may be operable to carry out at least the performing step of the method according to the sixth aspect of the present disclosure.

According to a tenth aspect of the present disclosure, there is provided a device comprising at least one of: the antenna apparatus according to the fifth aspect of the present disclosure, and the apparatus for antenna calibration according to any one of the second, fourth, seventh and ninth aspects of the present disclosure. For example, the device may comprise a user terminal or a network node.

In accordance with some exemplary embodiments, at least one of the first, second, third and fourth control units according to any of the preceding aspects of the present disclosure may each comprise a switch, and under the first operation mode of the switch the corresponding antenna path is connected with matched impedance. For example, the switch may be located between antenna dipoles and a circulator of the corresponding antenna path.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in details with reference to the accompanying drawings. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

MIMO is an advanced antenna technique to improve the spectral efficiency and thereby boost the overall system communication capacity. For example, massive MIMO makes a clean break with current practice through the use of a very large number of service antennas that can operate fully coherently and adaptively. Extra antennas may help by focusing the transmission and reception of signal energy into ever-smaller regions of space. This may bring a huge improvement in throughput and energy efficiency, in particularly when combined with simultaneous scheduling of a large number of user terminals (for example, tens or hundreds). MIMO was originally envisioned for time division duplex (TDD) operation, but can potentially be applied also in frequency division duplex (FDD) operation.

To make a full use of the advantages of multi-antenna techniques such as MIMO, it is required that transmission/reception chains of a multi-antenna transceiver have the same signal response characteristic, such as, phase rotation characteristic and amplitude scaling characteristic. To satisfy this requirement, an antenna calibration process, such as over-the-air (OTA) antenna calibration or coupler network based antenna calibration, may be performed, whereby differences in phase rotation and amplitude scaling among the transmission/reception chains can be compensated for.

Figure 1:
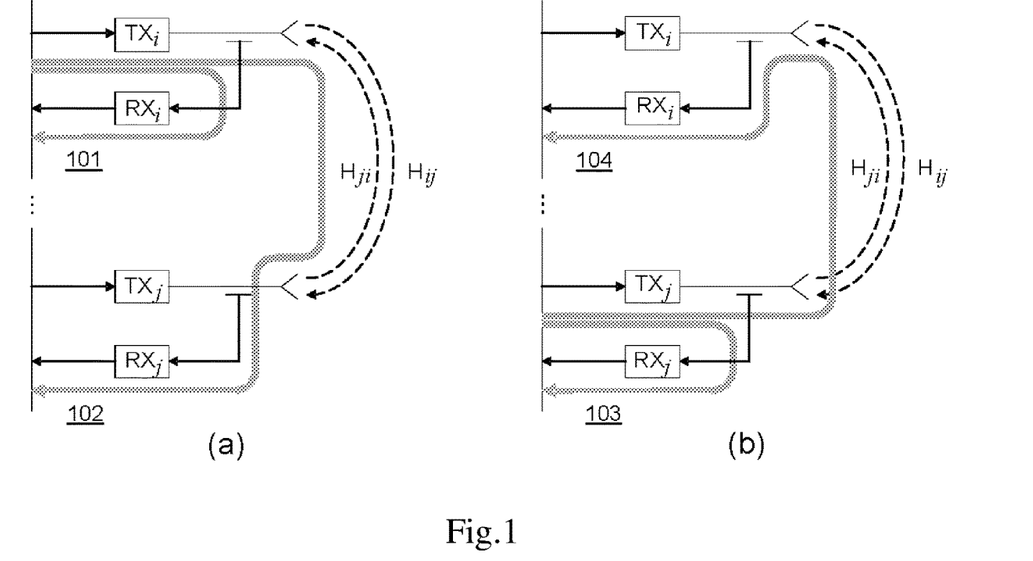
FIG. 1 is a diagram illustrating an example of antenna calibration according to some embodiments of the present disclosure.

FIG. 1 is a diagram illustrating an example of antenna calibration according to some embodiments of the present disclosure. The example illustrated in FIG. 1 may use the nature reciprocity property of the propagation over the air to perform antenna calibration, which may be called as the OTA antenna calibration. It will be appreciated that although FIG. 1 merely shows the OTA antenna calibration for two antennas i and j, more antennas may be deployed when implementing the OTA antenna calibration or any other suitable antenna calibration processes.

As shown in FIG. 1, an antenna may have a corresponding antenna path which may also be referred to as radio frequency (RF) path, for example, antenna path i for antenna i and antenna path j for antenna j. Since the antenna has the functionality of a transceiver, the antenna path or the RF path may comprise transmit (TX) path and/or receive (RX) path. FIG. 1 shows coupling signal measurements of a calibration signal for antenna path i in part (a), and coupling signal measurements of a calibration signal for antenna path j in part (b).

For example, the coupling back signal measurement $A_1$ (as denoted by line 101) from the TX side to the RX side of RF path i may be derived as:

$$A_1 = TX_i \cdot RX_i \quad (1)$$

where $TX_i$ and $RX_i$ represent the transmitted and received signals on RF path i, respectively.

The coupling signal measurement $B_1$ (as denoted by line 102) from the TX side of RF path i to the RX side of RF path j may be derived as:

$$B_1 = TX_i \cdot H_{ij} \cdot RX_j \quad (2)$$

where $H_{ij}$ represents the channel impulse response for the signal transmission from RF path i to RF path j, and $RX_j$ represents the received signal on RF path j.

Similarly, the coupling back signal measurement $C_1$ (as denoted by line 103) from the TX side to the RX side of RF path j may be derived as:

$$C_1 = TX_j \cdot RX_j \quad (3)$$

where $TX_j$ and $RX_j$ represent the transmitted and received signals on RF path j, respectively.

The coupling signal measurement $D_1$ (as denoted by line 104) from the TX side of RF path j to the RX side of RF path i may be derived as:

$$D_1 = TX_j \cdot H_{ji} \cdot RX_i \quad (4)$$

where $H_{ji}$ represents the channel impulse response for the signal transmission from RF path j to RF path i.

In accordance with some exemplary embodiments, a calibration signal which is sent out from the TX side of antenna i to the RX side of antenna j would pass through the same radio channel as being sent out from the TX side of antenna j to the RX side of antenna i. Thus, the channel impulse responses $H_{ij}$ and $H_{ji}$ may be considered the same. Then, the RF path i and RF path j can be calibrated over the air by deriving the measured values. For example, with the above measurements $A_1$, $B_1$, $C_1$ and $D_1$, the difference of TX paths i and j can be derived by:

$$\frac{A_1 \cdot B_1}{C_1 \cdot D_1} = \frac{TX_i \cdot RX_i \cdot TX_i \cdot H_{ij} \cdot RX_j}{TX_j \cdot RX_j \cdot TX_j \cdot H_{ji} \cdot RX_i} \quad (5)$$

Thus, TX paths i and j can be calibrated by compensating for the difference derived by equation (5). It will be understood that RX paths i and j can be calibrated as the same procedure.

Figure 2:
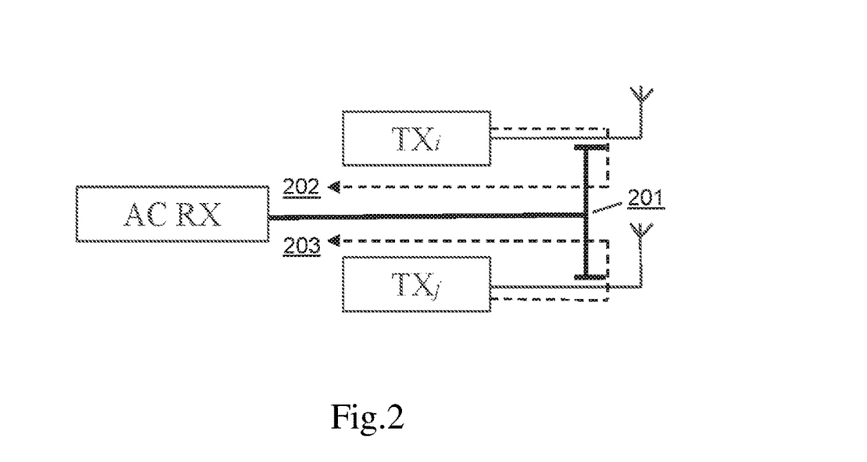
FIG. 2 is a diagram illustrating another example of antenna calibration according to some embodiments of the present disclosure.

FIG. 2 is a diagram illustrating another example of antenna calibration according to some embodiments of the present disclosure. The example illustrated in FIG. 2 may use a coupler network or a coupler 201 as an extra hardware with connection to perform antenna calibration, which may be called as the coupler network based antenna calibration. It is noted that FIG. 2 merely shows TX paths of two antennas i and j for ease of illustration, and more antennas may be deployed when implementing the coupler network based antenna calibration or any other suitable antenna calibration processes.

Similar to FIG. 1, FIG. 2 shows coupling signal measurements of a calibration signal for the TX path of antenna i and a calibration signal for the TX path of antenna j. For example, the coupling back signal measurement $A_2$ (as denoted by line 202) from the TX side of antenna i to the RX side at an antenna calibration unit (shown as AC RX in FIG. 2) may be derived as:

$$A_2 = TX_i \cdot RX_{AC} \quad (6)$$

where $TX_j$ represents the transmitted signal on the TX path of antenna i, and $RX_{AC}$ represents the received antennas calibration signal on the antenna calibration path.

The coupling signal measurement $B_2$ (as denoted by line 203) from the TX side of antenna j to the RX side at the antenna calibration unit (shown as AC RX in FIG. 2) may be derived as:

$$B_2 = TX_j \cdot RX_{AC} \quad (7)$$

where $TX_j$ represents the transmitted signal on the TX path of antenna j.

Then, the TX paths of antennas i and j can be calibrated via the coupler 201. For example, with the above measurements $A_2$ and $B_2$, the difference of TX paths of antennas i and j can be derived by:

$$\frac{A_2}{B_2} = \frac{TX_i \cdot RX_{AC}}{TX_j \cdot RX_{AC}} = \frac{TX_i}{TX_j} \quad (8)$$

Thus, the TX paths of antennas i and j can be calibrated by compensating for the difference derived by equation (8). It will be understood that the RX paths of antennas i and j can be calibrated as the same procedure.

The calibration approaches above may work well in many multi-antenna products. However, for some promising technologies in New Radio (NR), such as massive MIMO, there are some problems for the above approaches to satisfy the calibration requirements, especially for an mm Wave system.

Figure 3:
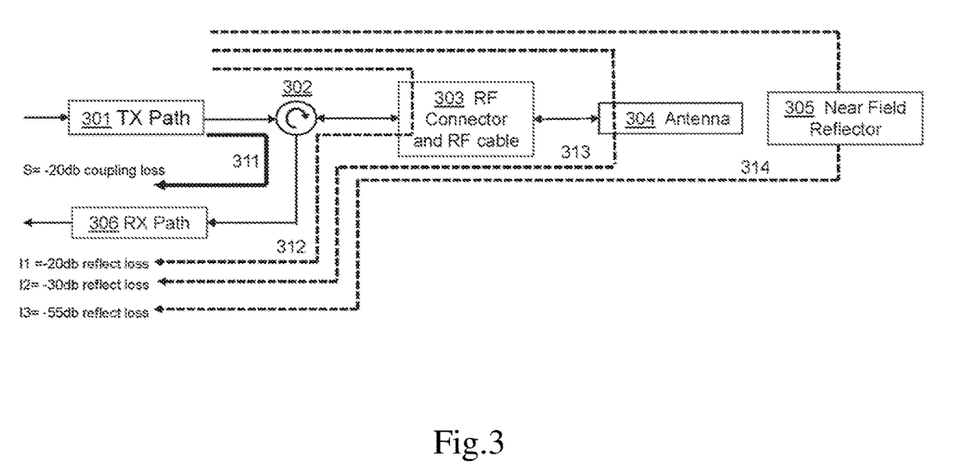
FIG. 3 is a diagram illustrating an example of antenna calibration connection and coupling loss according to some embodiments of the present disclosure.

FIG. 3 is a diagram illustrating an example of antenna calibration connection and coupling loss according to some embodiments of the present disclosure. The example illustrated in FIG. 3 shows that the performance of the OTA antenna calibration is degraded due to the interferences of reflected signals. For the OTA antenna calibration, the foundation is to couple a TX signal from a TX path 301 back and directly measure it in a RX path 306. As shown in FIG. 3, there would be mainly four paths 311-314 for the TX signal being fed back to the RX path, including coupling through a circulator 302, a RF connector and RF cable (or simply a RF cable) 303, an antenna 304 and a near field reflector 305.

It is noted that the coupling back signal in path 311 is mixed with many other reflected signals (such as signals reflected in paths 312-314) with different reflect loss values and delays. As the expected calibration signal, the signal from the TX path 301 coupled back by the circulator 302 due to the nature of circulator (such as isolation between downlink and uplink), which is indicated as "$S_O$" in FIG. 3, would have the coupling loss about 20 db (or similar level) in a real product.

However, many in-active components may cause reflecting, such as the RF cable 303 due to mismatch impedance. This may cause standing wave (reflecting), which much depends on the installation of RF cables. For example, the voltage standing wave ratio (VSWR) may be used to present this reflecting strength. Normally, the unwanted reflecting in path 312, which is indicated as I1$_O$" in FIG. 3, may introduce interference with about −20 db propagation loss. Such unwanted reflecting may constitute 0 db interference to the expected received signal.

Similarly, the antenna 304 and the near field reflector 305 may also reflect back some TX signal and feedback to the RX measurement path 306, which are indicated as "I2$_O$" and "I3$_O$" in FIG. 3. This may introduce interferences with about −30 db and −55 db propagation loss, respectively in a typical product.

Therefore, all these unexpected reflected signals are the interferences for the wanted calibration signal, and all interference signals are at similar strength level of the wanted calibration signal. Furthermore, the reflected signals may be different for individual RF paths. For example, the VSWRs are different for all RF paths.

In addition, it is noted that the interference signals would have different round trip propagation delays and can reach around 1 ns to 100 ns delay. For example, the standing wave from the RF cable 303 may have about 1 ns round-trip delay. So from the signal processing point of view, the calibration signal with such low delay spread multi-path is very challenging to be removed by pure digital signal processing method.

Figure 4:
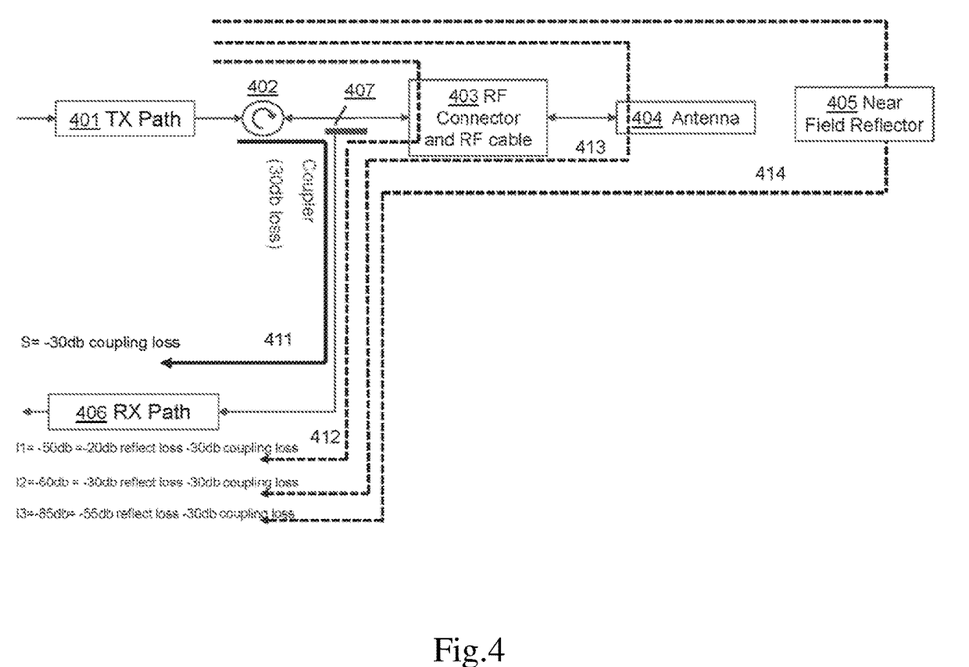
FIG. 4 is a diagram illustrating another example of antenna calibration connection and coupling loss according to some embodiments of the present disclosure.

FIG. 4 is a diagram illustrating another example of antenna calibration connection and coupling loss according to some embodiments of the present disclosure. The example illustrated in FIG. 4 shows that the performance of the coupler network based antenna calibration would not significantly affected by the reflections as in the case of the OTA antenna calibration. Similar to FIG. 3, there would be mainly four paths 411-414 for a TX signal from a TX path 401 being fed back to a RX path 406, including coupling through a circulator 402, a RF connector and RF cable (or simply a RF cable) 403, an antenna 404 and a near field reflector 405, as shown in FIG. 4.

Different from FIG. 3, the calibration signal from the TX path 401 will be coupled back by a coupler 407, and the coupling loss from the TX path 401 to the RX path 406 through the circulator 402 can reach 30 db (or similar level), as indicated by "$S_C$" in FIG. 4.

In addition, all the other reflected signals in paths 412-414 would go through this coupler 407 and suffer both reflecting loss and coupling loss, as indicated by "I1$_C$", "I2$_C$" and "I3$_C$" in FIG. 4. This dual-stage loss will make the unwanted reflected signal at least 20 db lower than the wanted signal, which is directly coupled back by the coupler 407. Thus, although the coupler 407 cannot avoid reflection, it can constraint interference 20 db lower than the wanted signal, which can guarantee an accurate antenna calibration.

One of the major requirements for the coupler network based antenna calibration is the signal loss and phase change for each RF path from/to the coupler should be the same, which may be guaranteed by the antenna factory test. Otherwise, the difference will be regarded as the working RF paths difference. This would undermine the accuracy of the coupler network based antenna calibration subsequently.

However, an apparatus may have a large number of antenna elements, for example, when employing MIMO or massive MIMO techniques. This constitutes challenges for coupler network hardware design and connection among antennas. According to an exemplary embodiment, the concept of "antenna panel", which is comprised by a group of antennas, may be introduced for a user terminal and/or a network node. For example, multiple antenna panels may be deployed on the user terminal side and/or the network node side. In this case, the antenna calibration would have to be done within and between the antenna panels. This introduces implementation problems to the coupler designed to calibrate the panels which is described in detail below.

Figure 5:
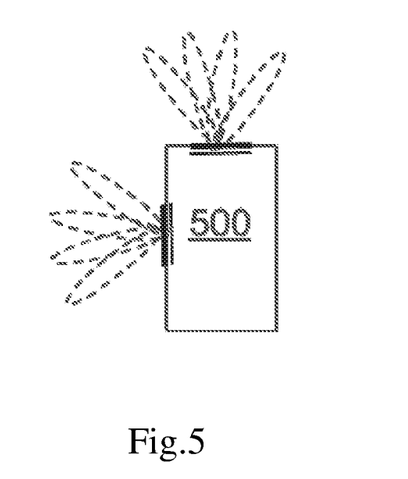
FIG. 5 is a diagram illustrating a user terminal equipped with multiple antenna panels according to some embodiments of the present disclosure.

FIG. 5 is a diagram illustrating a user terminal equipped with multiple antenna panels according to some embodiments of the present disclosure. For example, the user terminal 500 as shown in FIG. 5 may be a user equipment (UE), a mobile station, a wireless terminal, a personal digital assistant (PDA), a laptop computer, a tablet computer, a smart phone, a portable device, or any other user device being capable of participating in communication of a wireless network.

Limited by the terminal size, the user terminal 500 may be equipped with multiple antenna panels or arrays. It will be realized that the user terminal 500 may be equipped with more antenna panels although only two antenna panels are plotted in FIG. 5. For each panel, a coupler may be integrated and coupled with all antennas in the panel, which would have the relative similar coupling loss and phase values for all antennas paths.

The antenna panels may be installed in different positions, for example, up, left and right sides of the user terminal. Thus, an inter-panel coupler cannot be integrated with the individual antenna itself, and normally implemented by the terminal manufactory. It is necessary to calibrate the multiple antenna panels using the inter-panel coupler.

Figure 6:
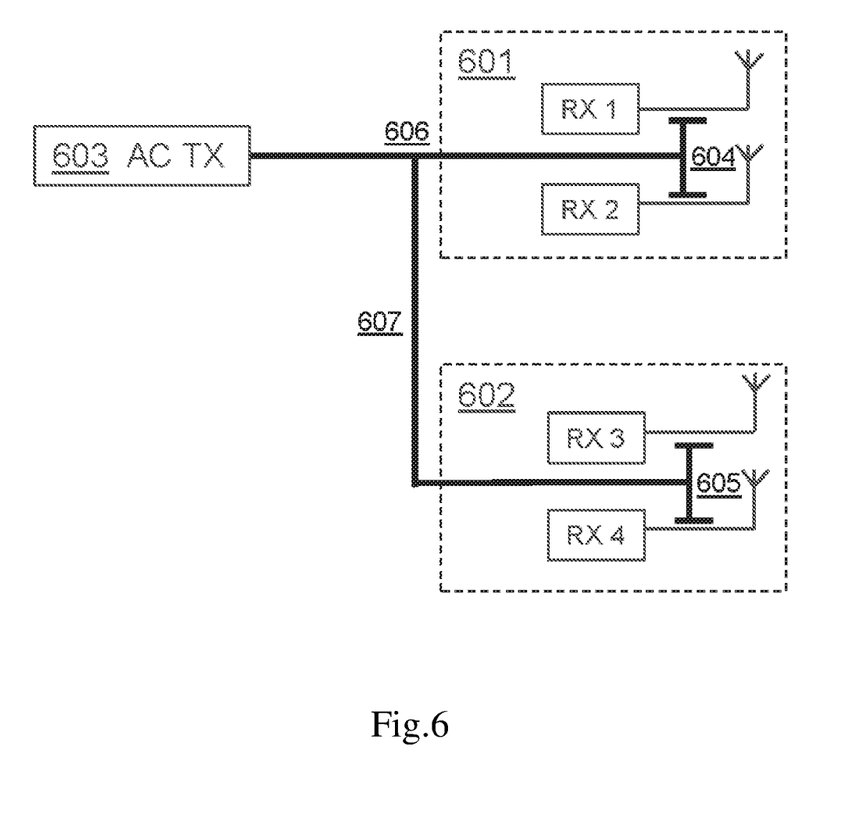
FIG. 6 is a diagram illustrating an example of inter-panel calibration according to some embodiments of the present disclosure.

FIG. 6 is a diagram illustrating an example of inter-panel calibration according to some embodiments of the present disclosure. As shown in FIG. 6, two antenna panels, panel A 601 with antenna 1 and antenna 2, panel B 602 with antenna 3 and antenna 4, may be installed in an apparatus for communications. The apparatus may be a user terminal such as the user terminal 500 or a network node. For example, the network node may comprise an evolved Node B (eNB), access point (AP), a base station (BS), a communication node, a control center, a relay station, a repeater, or any other network device being capable of participating in communication of a wireless network.

Here for simplicity, only RX paths (shown as RX 1, RX 2, RX 3 and RX 4 in FIG. 6) in the antenna panels and the related calibration paths are shown in FIG. 6. TX paths may be similar with the RX paths. For the coupler 604 or 605 within either antenna panel, the similarity can usually be guaranteed. Thus, the accuracy of intra-panel calibration may be guaranteed, for example, by means of the coupler network based antenna calibration. But for inter-panel calibration, which involves the inter-panel couplers 606 and 607 connected to an antenna calibration unit 603 (shown as AC TX in FIG. 6), it is difficult to guarantee its similarity by non-integrated RF components, especially in mm Wave communication. For example, 35 GHz, 1 mm RF cable difference will introduce 40-degree phase difference.

Therefore, it is difficult to keep the coupling loss and phase changes from all working RF paths to the calibration RF path similar due to the supper high requirements on manufacture. Thus, it is difficult to implement the coupler network based antenna calibration for inter-panel calibration. At eNB side, especially macro-base station, although individual antennas themselves are centralized and integrated, they are normally divided into multiple antenna panels to maintain a reasonable manufactory complexity and cost. Thus, similar with UE side, coupling loss and phase changes between the inter-panel couplers at eNB side also cannot guarantee same to each working RF path. Thus, it is necessary to consider the inter-panel calibration for the beamforming at UE-side and/or eNB side.

Figure 7:
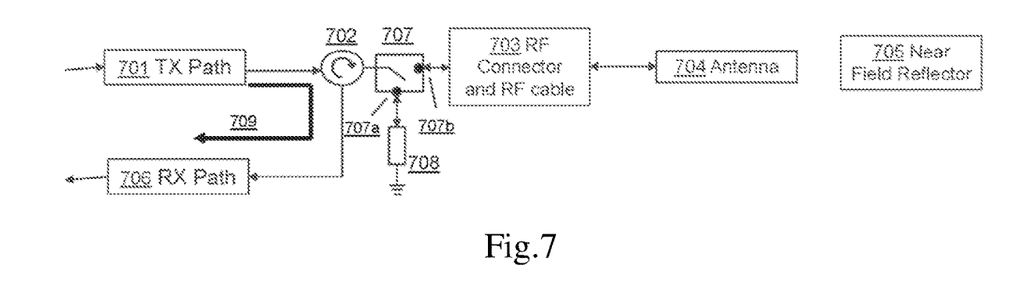
FIG. 7 is a diagram illustrating an example of calibration improvement according to some embodiments of the present disclosure.

FIG. 7 is a diagram illustrating an example of calibration improvement according to some embodiments of the present disclosure. The improvement shown in FIG. 7 is achieved on the OTA antenna calibration with a control unit on a RF path to avoid the unexpected reflection. Similar to FIG. 3, there may be several elements on an antenna/RF path, such as a circulator 702, a RF connector and RF cable (or simply a RF cable) 703 and an antenna 704. The RF cable 703 and the antenna 704 may also be regarded as part of antenna dipoles.

Different from FIG. 3, a control unit 707 (such as a RF switch) is added before the RF cable 703 as shown in FIG. 7. It is noted that the control unit 707 may be referred to as a first, second, third or fourth control unit when it is located on different RF or antenna paths, as described later with respect to FIGS. 8-13. With this control unit 707, if a signal from RF path i is required to send to another RF path j, where i≠j, the control unit 707 may steer to a connector 707b to connect the RF path with the RF cable 703. As such, the RF path may work under a normal mode in which a RF signal may be sent out through the antenna 704.

When the RF path is working under the self-coupling mode for the self-coupling back measurement, a TX signal from a TX path 701 is required to couple back 709 to a RX path 706 through a circulator 702, and then the control unit 707 may steer to a connector 707a to connect the RF path with the matched impedance 708. As such, the RF cable 703 and the antenna 704 are disconnected from the RF path. Thus, all standing waves and reflections will be isolated due to this matched impedance 708 and there will be no other signals reflected by the RF cable 703, the antenna 704 and a near field reflector 705. This can solve the reflecting issue of the OTA antenna calibration.

Figure 8:
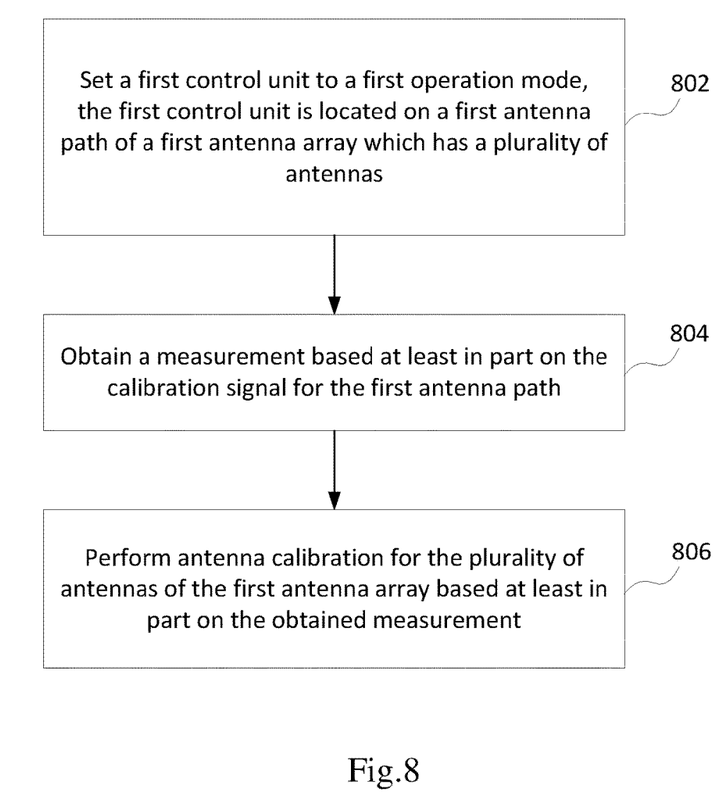
FIG. 8 is a flowchart illustrating a method for antenna calibration according to some embodiments of the present disclosure.

FIG. 8 is a flowchart illustrating a method for antenna calibration according to some embodiments of the present disclosure. The method illustrated in FIG. 8 may be performed by an apparatus implemented at a user terminal or a network node. Alternatively, the method may also be implemented by an apparatus communicatively coupled to a user terminal or a network node. It will be realized that the user terminal and/or the network node in the embodiments may employ MIMO or massive MIMO techniques by deploying at least one antenna array which has a plurality of antennas.

According to the exemplary method illustrated in FIG. 8, a first control unit may be set to a first operation mode at step 802. For example, the first control unit may be located on a first antenna path of a first antenna array which has a plurality of antennas. Under the first operation mode of the first control unit, a calibration signal for the first antenna path can be isolated from interference. Since the interference such as unwanted reflected signals can be eliminated during antenna calibration, the unexpected signals due to the reflection as described with respect to the OTA antenna calibration approach may be removed so as to guarantee the calibration accuracy.

In accordance with the exemplary method illustrated in FIG. 8, a measurement may be obtained at step 804 based at least partly on the calibration signal for the first antenna path. It will be appreciated that the measurement for antenna calibration may be obtained in the manner as described in connection with FIG. 1 or FIG. 2, depending on whether a coupler network is used for the first antenna array. During the measurement, the first antenna path may work under the self-coupling mode where the calibration signal for the first antenna path may be transmitted and then coupled back to the calibration measurement side of the first antenna path without any other unwanted reflected signals. Thus, the measurement obtained at the calibration measurement side of the first antenna path may comprise the expected coupling back signal without significant interfering signals.

Based at least partly on the obtained measurement, antenna calibration may be performed for the plurality of antennas of the first antenna array at step 806. For example, the obtained measurement may be used to derive the antenna paths difference for the first antenna array, and the plurality of antennas of the first antenna array can be calibrated by compensating for the derived difference. It will be realized that some measurements for other antenna paths of the first antenna array may be obtained for the antenna calibration by properly setting respective control units located on the other antenna paths, such as, a second antenna path of the first antenna array.

In accordance with some embodiments, a second control unit may be located on a second antenna path of the first antenna array and set to the first operation mode. Under the first operation mode of the second control unit, a calibration signal for the second antenna path can be isolated from interference. Accordingly, the measurement obtained at step 804 for the antenna calibration of the first antenna array may comprise at least a measurement of the calibration signal for the first antenna path coupled back to the first antenna path and a measurement of the calibration signal for the second antenna path coupled back to the second antenna path.

As shown in FIG. 3 and FIG. 4, a calibration signal for an antenna path may be coupled back to the antenna path through a circulator located on this antenna path. In some exemplary embodiments, the first control unit may comprise a switch. Under the first operation mode of the switch, the first antenna path is connected with matched impedance. The switch may be located between antenna dipoles and a circulator of the first antenna path. Similarly, the second control unit may comprise a switch located between antenna dipoles and a circulator of the second antenna path. Under the first operation mode of the switch, the second antenna path is connected with its matched impedance to isolate interference. Introduce of a control unit to each antenna path can avoid the unexpected reflecting problem in the OTA antenna calibration approach and thus improve the calibration performance.

As described above, the method as illustrated in FIG. 8 can be sued to improve calibration of a plurality of antennas within an antenna array, which may be referred to as intra-array or intra-panel calibration. In some embodiments, the proposed method may also be applicable to antenna calibration between multiple antenna arrays, which may also be referred to as inter-array or inter-panel calibration. To this regard, the first antenna array may be coupled to a second antenna array having a plurality of antennas. Before performing inter-array calibration of the first and second antenna arrays, the intra-array calibration has been implemented for the first antenna array and the second antenna array respectively. It will be realized that the plurality of antennas of the second antenna array may be calibrated in a similar way as the plurality of antennas of the first antenna array by using the method as illustrated in FIG. 8.

According to an exemplary embodiment of inter-array calibration, the first control unit can be adjusted to a first operation mode as described with respect to FIG. 8, where the first control unit connects the first antenna path with the matched impedance. A measurement of the calibration signal for the first antenna path respectively coupled back to a second antenna path of the first antenna array, third and fourth antenna paths of the second antenna array may be obtained under the first operation mode. Based at least partly on the obtained measurement, antenna calibration may be performed between the first and second antenna arrays. Alternatively or additionally, the first and/or second antenna arrays may comprise other control units such as some RF switches to assist the antenna calibration. For example, multiple antenna arrays can be calibrated together with the coupler network and the corresponding RF switches to remove the inter-array difference.

Figure 9A:
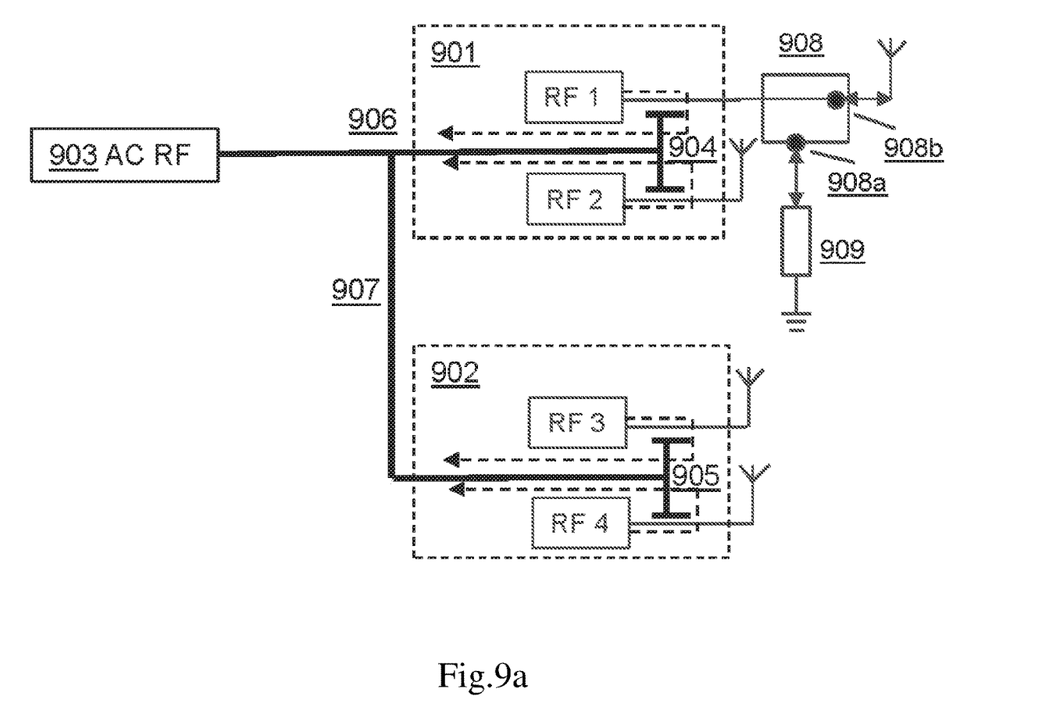
FIG. 9a is a diagram illustrating an example of intra-panel calibration with a coupler network according to some embodiments of the present disclosure.

FIG. 9a is a diagram illustrating an example of intra-panel calibration with a coupler network according to some embodiments of the present disclosure. As shown in FIG. 9a, two antenna panels, panel A 901 with antenna 1 and antenna 2, panel B 902 with antenna 3 and antenna 4, may be installed in an apparatus for MIMO wireless communications. As illustrated in FIG. 6, the respective couplers 904 and 905 within antenna panels 901 and 902 can guarantee an accurate intra-panel calibration by means of the coupler network based antenna calibration. But for inter-panel calibration, which involves inter-panel couplers 906 and 907 connected to an antenna calibration unit 903 (shown as AC RF in FIG. 9a), it would be difficult to guarantee the similarity due to non-integrated RF components. Thus, two steps are proposed for the antenna calibration, denoted as intra-panel calibration and inter-panel calibration.

For the intra-panel calibration as shown in FIG. 9a, one of RF paths of antennas 1 to 4 (shown as RF 1, RF 2, RF 3 and RF 4) may be selected from each antenna panel as the calibration reference path. The selected calibration reference path has a corresponding control unit 908 such as a RF switch. For example, the RF path of antenna 1 (denoted as RF 1) is selected as the calibration reference path of panel A 901. Although not shown in FIG. 9a, panel B 902 can be designed similarly, for example, having control units and matched impedances. It is noted that the control unit 908 located on respective RF or antenna paths may be referred to as a first, second, third or fourth control unit in order to make a distinction. When the control unit 908 steers to a RF connector 908b, the matched impedance 909 is disconnected from RF 1, and a signal from RF 1 may be coupled back to the antenna calibration unit 903. Thus, the intra-panel calibration may be performed according to the coupler network based antenna calibration as described with respect to FIG. 2.

In an exemplary embodiment, the downlink calibration procedure for the RF paths in the same antenna panel can be performed based at least partly on TX calibration measurements of different RF paths. For example, the respective TX calibration measurements $A_{TX}$, $B_{TX}$, $C_{TX}$ and $D_{TX}$ of RF paths 1, 2, 3 and 4 may be expressed as:

$$A_{TX} = TX_1 \cdot H_{AC} \cdot RX_{AC} \quad (9)$$

$$B_{TX} = TX_2 \cdot H_{AC} \cdot RX_{AC} \quad (10)$$

$$C_{TX} = TX_3 \cdot H'_{AC} \cdot RX_{AC} \quad (11)$$

$$D_{TX} = TX_4 \cdot H'_{AC} \cdot RX_{AC} \quad (12)$$

where $TX_i$ represents the transmitted signal on the TX path of antenna i (i=1, 2, 3, 4), $RX_{AC}$ represents the received antennas calibration signal on the antenna calibration path, $H_{AC}$ represents the channel impulse response for the signal transmission through the coupler 906, and $H'_{AC}$ represents the channel impulse response for the signal transmission through the coupler 907.

The TX paths in the same antenna panel can be well calibrated based at least partly on the measurements of $A_{TX}$, $B_{TX}$, $C_{TX}$ and $D_{TX}$. For example, the TX paths of RF 1 and RF 2 in panel A 901 can be calibrated according to the following expression:

$$A_{TX}/B_{TX}=TX_1/TX_2 \qquad (13)$$

Similarly, the TX paths of RF 3 and RF 4 in panel B 902 can be calibrated according to the following expression:

$$C_{TX}/D_{TX}=TX_3/TX_4 \qquad (14)$$

Correspondingly, the uplink calibration procedure for the RX paths in the same antenna panel can be performed based at least partly on RX calibration measurements of different RF paths. For example, the respective RX calibration measurements $A_{RX}$, $B_{RX}$, $C_{RX}$ and $D_{RX}$ of RF paths 1, 2, 3 and 4 may be expressed as:

$$A_{RX}=TX_{AC} \cdot H_{AC} \cdot RX_1 \qquad (15)$$

$$B_{RX}=TX_{AC} \cdot H_{AC} \cdot RX_2 \qquad (16)$$

$$C_{RX}=TX_{AC} \cdot H'_{AC} \cdot RX_3 \qquad (17)$$

$$D_{RX}=TX_{AC} \cdot H'_{AC} \cdot RX_4 \qquad (18)$$

where $RX_i$ represents the received signal on the RX path of antenna i (i=1, 2, 3, 4), and $TX_{AC}$ represents the transmitted antennas calibration signal on the antenna calibration path.

Then, the RX paths in the same antenna panel can be well calibrated based at least partly on the measurements of $A_{RX}$, $B_{RX}$, $C_{RX}$ and $D_{RX}$. For example, the RX paths of RF 1 and RF 2 in panel A 901 can be calibrated according to the following expression:

$$A_{RX}/B_{RX}=RX_1/R_2 \qquad (19)$$

Similarly, the RX paths of RF 3 and RF 4 in panel B 902 can be calibrated according to the following expression:

$$C_{RX}/D_{RX}=RX_3/RX_4 \qquad (20)$$

However, due to the manufacture limitation and extra connection, the effective channel for the signal between panels would be different with the effective channel for the signal between paths in the same panel, i.e., $H_{AC} \neq H'_{AC}$. Thus, it is necessary to further calibrate panels in the inter-panel calibration procedure.

Figure 9B:
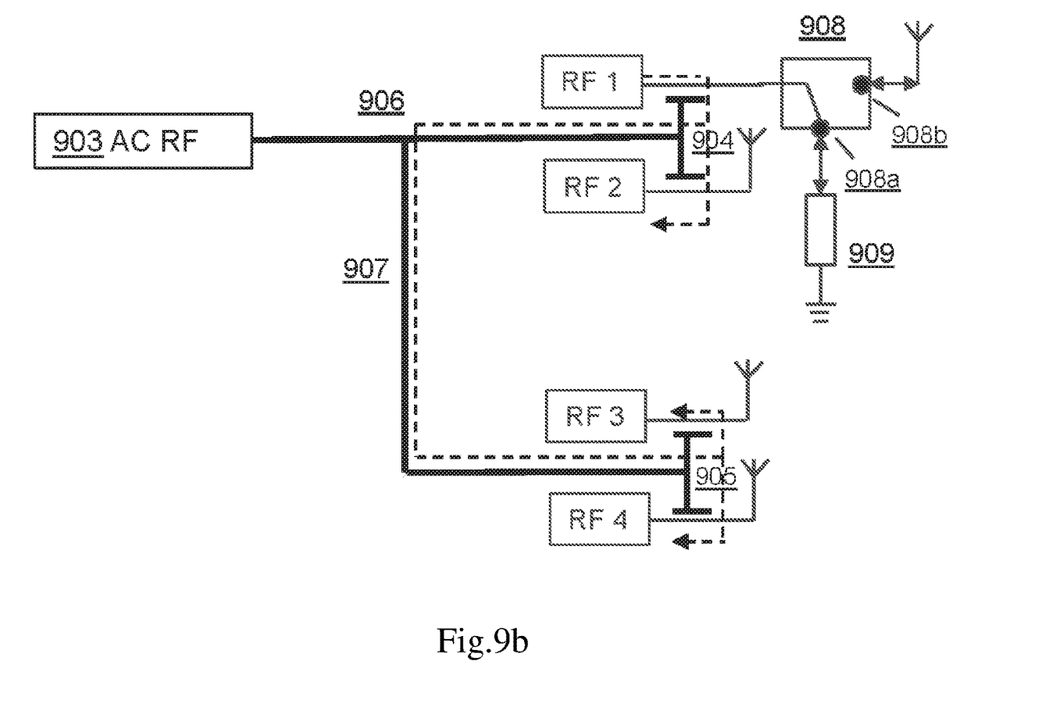
FIG. 9b is a diagram illustrating an example of inter-panel calibration with a coupler network according to some embodiments of the present disclosure.

FIG. 9b is a diagram illustrating an example of inter-panel calibration with a coupler network according to some embodiments of the present disclosure. As described with respect to FIG. 4, the coupler network based calibration approach can be well done for the RF paths in each panel, but due to the inter-panel coupler difference, the RF paths between the antenna panels still have some residual calibration error. To remove the inter-coupler difference, the control unit 908 may steer to a connector 908a to connect the corresponding RF path with the matched impedance 909, as shown in FIG. 9b. In this mode, the signal transferred from RF 1 will be coupled into the couplers 904, 906, 907 and 905, and then coupled back to other RF paths (such as RF 2, RF 3 and RF 4). Thus, the residual calibration error can be measured and removed according to some calibration measurements for RF 2, RF 3 and RF 4.

For example, the calibration signal transmitted from the TX path of RF 1 is coupled back to RF 2, RF 3 and RF 4, and the respective measurements E, F and G at the RX paths of RF 2, RF 3 and RF 4 may be expressed as:

$$E=TX_1 \cdot H_{AC} \cdot RX_2 \qquad (21)$$

$$F=TX_1 \cdot H_{AC} \cdot H'_{AC} \cdot RX_3 \qquad (22)$$

$$G=TX_1 \cdot H_{AC} \cdot H'_{AC} \cdot RX_4 \qquad (23)$$

From equations (9) and (11), difference between TX paths of two panels can be derived as:

$$TX_1/TX_3=(A_{TX} \cdot H'_{AC})/(C_{TX} \cdot H_{AC}) \qquad (24)$$

Similarly, from equations (16) and (17), difference between RX paths of two panels can be derived as:

$$RX_2/RX_3=(B_{RX} \cdot H'_{AC})/(C_{RX} \cdot H_{AC}) \qquad (25)$$

Then, the following equation can be derived by combining and replacing values in equations (24) and (25).

$$E/F=RX_2/(H'_{AC} \cdot RX_3)=B_{RX}/(C_{RX} \cdot H_{AC}) \qquad (26)$$

Thus, the effective channel of panel A 901, i.e., calibration coupler network loss and phase rotate in the panel A 901, can be derived as:

$$H_{AC}=(B_{RX} \cdot F)/(C_{RX} \cdot E) \qquad (27)$$

Using similar derivation by selecting one TX path in panel B 902, for example, the TX path of RF 3, as the calibration path, the calibration signal transmitted from the TX path of RF 3 is coupled back to RF 1, RF 2 and RF 4. The respective measurements E', F' and G' at the RX paths of RF 1, RF 2 and RF 4 may be expressed as:

$$E'=TX_3 \cdot H_{AC} \cdot H'_{AC} \cdot RX_1 \qquad (28)$$

$$F'=TX_3 \cdot H_{AC} \cdot H'_{AC} \cdot RX_2 \qquad (29)$$

$$G'=TX_3 \cdot H'_{AC} \cdot RX_4 \qquad (30)$$

Thus, the effective channel of panel B 902, i.e., calibration coupler network loss and phase rotate in the panel B 902, can be derived as:

$$H'_{AC}=(E' \cdot D_{RX})/(A_{RX} \cdot G') \qquad (31)$$

Therefore, the couplers for all panels can be calibrated with the calibration coupler network loss and phase rotate values $H_{AC}$ and $H'_{AC}$.

Alternatively or additionally, to keep the robustness of the antenna calibration, multiple RF paths in an antenna panel can be selected as the calibration reference path candidates in MIMO. If any one selected calibration reference path fails, the antenna calibration can also be performed by switching to another one.

For the intra-panel calibration as shown in FIG. 9a, the antennas in each panel can be calibrated with the tight connected coupler network in the panel with the control unit assistance. For the calibration between antenna panels, as the inter-panel calibration shown in FIG. 9b, the separate couplers between the antenna panels can also be calibrated with the help of control unit and the coupler network on the top of the intra-panel calibration. This can solve the residual error caused by inter-panel couplers difference. In addition, the simple extra hardware and control unit would not dramatically increase the implementation complexity and cost.

Figure 10:
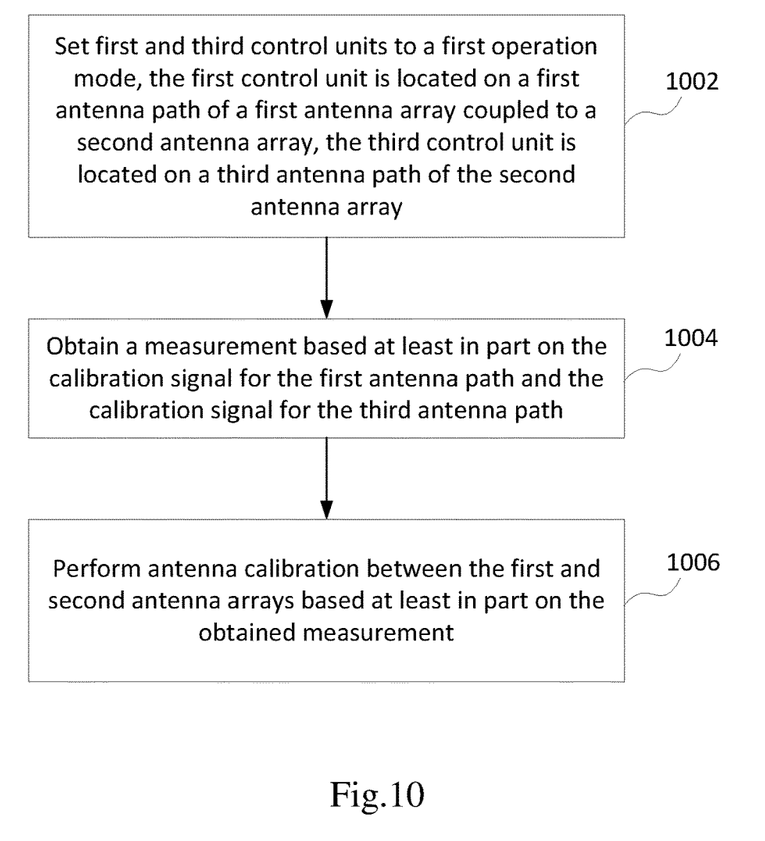
FIG. 10 is a flowchart illustrating a method for antenna calibration according to some embodiments of the present disclosure.

FIG. 10 is a flowchart illustrating a method for antenna calibration according to some embodiments of the present disclosure. The method illustrated in FIG. 10 may be performed by an apparatus implemented at a user terminal or a network node. Alternatively, the method may also be performed by an apparatus communicatively coupled to a user terminal or a network node. It will be realized that the user terminal and/or the network node in the embodiments may deploy at least one antenna array having a plurality of antennas.

According to the exemplary method illustrated in FIG. 10, a first control unit located on a first antenna path of a first antenna array and a third control unit located on a third antenna path of a second antenna array may be set to a first operation mode at step 1002. The first antenna array, which has a plurality of antennas having been calibrated, is coupled to a second antenna array having a plurality of antennas which have been calibrated. Under the first operation mode of the first control unit, a calibration signal for the first antenna path can be isolated from interference. Similarly, under the first operation mode of the third control unit, a calibration signal for the third antenna path can be isolated from interference.

In accordance with the embodiments, a measurement may be obtained at step 1004 based at least partly on the calibration signal for the first antenna path and the calibration signal for the third antenna path. Based at least partly on the obtained measurement, antenna calibration may be performed between the first and second antenna arrays at step 1006.

According to the exemplary embodiments, the obtained measurement may comprise, for example, a measurement of the calibration signal for the first antenna path respectively coupled back to a second antenna path of the first antenna array, the third antenna path and a fourth antenna path of the second antenna array; and a measurement of the calibration signal for the third antenna path respectively coupled back to the first and second antenna paths of the first antenna array, and the fourth antenna path of the second antenna array.

Alternatively, the operations or functions performed by steps 1002 and 1004 in the exemplary method may be carried out in different sequences and/or by more or less steps. For example, in another exemplary method for antenna calibration, a measurement of the calibration signal for the first antenna path may be obtained in response to setting the first control unit to the first operation mode, while the third control unit may work or may not work under the first operation mode. Similarly, a measurement of the calibration signal for the third antenna path may be obtained in response to setting the third control unit to the first operation mode, while the first control unit may work or may not work under the first operation mode. Then the antenna calibration may be performed between the first and second antenna arrays based at least partly on the obtained measurement.

To improve the reliability and robustness of the antenna calibration, at least one another antenna path of the first and/or second antenna array can be selected to replace the failed antenna path for assisting the antenna calibration. For example, in response to a failure of the first antenna path, a second control unit located on a second antenna path of the first antenna array may be set to the first operation mode under which a calibration signal for the second antenna path can be isolated from interference. A measurement of the calibration signal for the second antenna path respectively coupled back to the first antenna path of the first antenna array, the third and a fourth antenna paths of the second antenna array may be obtained. Correspondingly, the antenna calibration between the first and second antenna arrays may be performed based at least partly on the obtained measurement.

Alternatively or additionally, in response to a failure of the third antenna path, a fourth control unit located on the fourth antenna path of the second antenna array may be set to the first operation mode under which a calibration signal for the fourth antenna path can be isolated from interference. Similarly, a measurement of the calibration signal for the fourth antenna path respectively coupled back to the third antenna path of the second antenna array, the first and the second antenna paths of the first antenna array may be obtained for performing the antenna calibration between the first and second antenna arrays.

In accordance with the exemplary embodiments, at least one of the first, second, third and fourth control units may each comprise a switch. Under the first operation mode of the switch, the corresponding antenna path is connected with matched impedance. For example, the switch may be located between antenna dipoles and a circulator of the corresponding antenna path. If the switch is set to a second operation mode, then the corresponding antenna path is disconnected from the matched impedance but connected with the antenna dipoles through the switch.

According to the exemplary embodiments, at least one of the calibration of the plurality of antennas of the first antenna array and the calibration of the plurality of antennas of the second antenna array may be based at least partly on antenna calibration with a coupler network. For example, the plurality of antennas within the first or the second antenna array may be calibrated, for example, by utilizing the intra-panel calibration approach described with respect to FIG. 9a. To this regard, some measurements for the intra-panel calibration may be obtained when the first control unit and/or the third control unit is set to the second operation mode. For example, under the second operation mode of the first control unit, the first antenna path is disconnected from its matched impedance but connected with the corresponding antenna dipoles. Thus, the interference to the calibration signal for the first antenna path would not be isolated.

The proposed method can remove the unexpected reflection in the OTA antenna calibration approach so as to guarantee the calibration accuracy. Alternatively or additionally, the proposed method can effectively calibrate the antenna panels together with the coupler network and the control unit to remove the inter-panel couplers difference. In addition, the proposed method can be implemented with acceptable complexity and cost.

The various blocks or information flows shown in FIGS. 1-10 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 11:
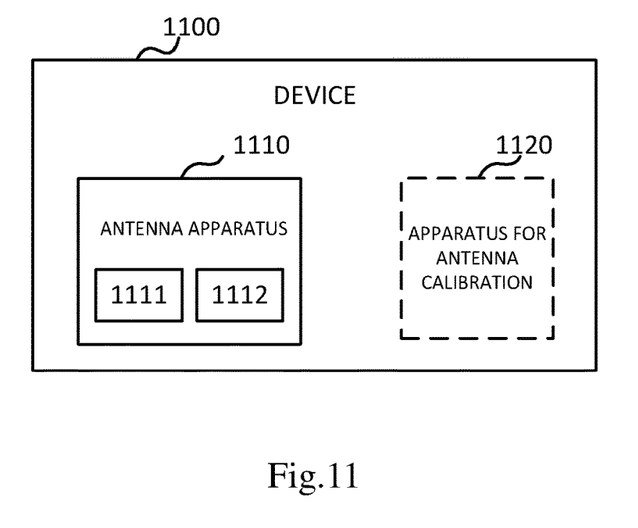
FIG. 11 is a block diagram illustrating a device according to some embodiments of the present disclosure.

FIG. 11 is a block diagram illustrating a device 1100 according to some embodiments of the present disclosure. The device 1100 illustrated in FIG. 11 may comprise or be implemented at a user terminal (such as UE) or a network node (such as eNB). As shown in FIG. 11, the device 1100 may comprise an antenna apparatus 1110 and optionally an apparatus for antenna calibration 1120. In the exemplary embodiments, the apparatus for antenna calibration 1120 may be an apparatus 1200 shown in FIG. 12 or an apparatus 1300 shown in FIG. 13.

In accordance with the embodiments, the antenna apparatus 1110 may comprise a first antenna array 1111 and a first control unit 1112. The first antenna array 1111 may have a plurality of antenna paths, and the first control unit 1112 may be located on a first antenna path of the first antenna array to control calibration interference. Under a first operation mode of the first control unit, a calibration signal for the first antenna path can be isolated from interference. As mentioned previously, the first control unit 1112 may comprise a switch, and under the first operation mode of the switch, the first antenna path is connected with matched impedance. The switch may be located between antenna dipoles and a circulator of the first antenna path.

Figure 12:
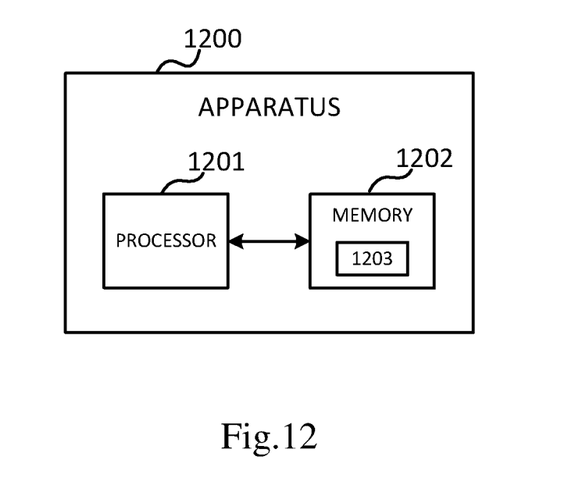
FIG. 12 is a block diagram illustrating an apparatus according to some embodiments of the present disclosure.

FIG. 12 is a block diagram illustrating an apparatus 1200 according to some embodiments of the present disclosure. As shown in FIG. 12, the apparatus 1200 may comprise at least one processor 1201 and at least one memory 1202 storing computer program code 1203. The at least one memory 1202 and the computer program code 1203 may be configured to, with the at least one processor 1201, cause the apparatus 1200 at least to perform any step of the method as described in connection with FIG. 8 or FIG. 10. Alternatively or additionally, the at least one memory 1202 and the computer program code 1203 may be configured to, with the at least one processor 1201, cause the apparatus 1200 at least to perform more or less steps to implement the proposed method.

Figure 13:
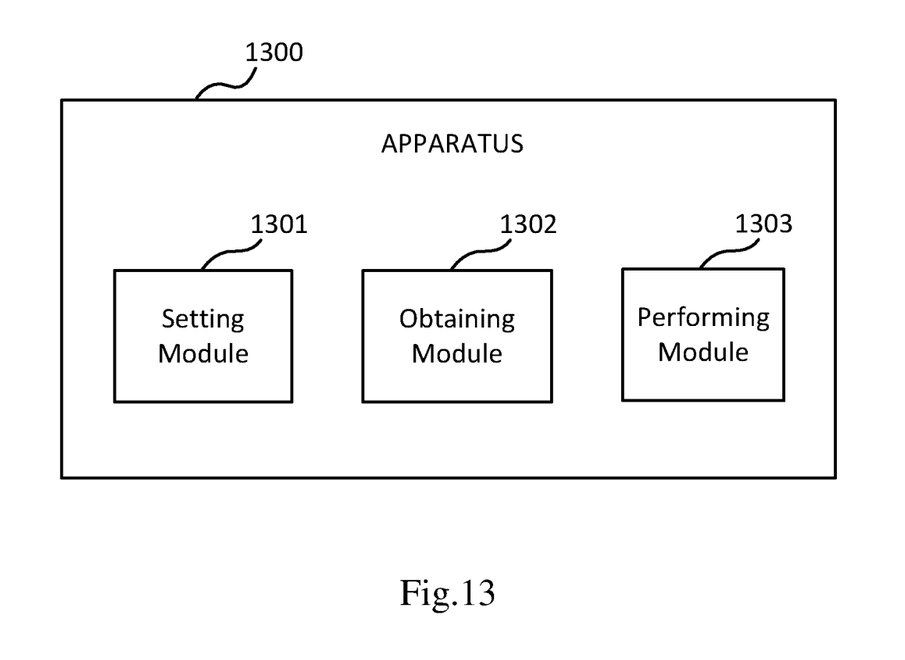
FIG. 13 is a block diagram illustrating another apparatus according to some embodiments of the present disclosure.

FIG. 13 is a block diagram illustrating another apparatus 1300 according to some embodiments of the present disclosure. As shown in FIG. 13, the apparatus 1300 may comprise a setting module 1301, an obtaining module 1302 and a performing module 1303. In an exemplary embodiment, the setting module 1301 may be operable to carry out step 802, the obtaining module 1302 may be operable to carry out step 804, and the performing module 1303 may be operable to carry out step 806. Alternatively or additionally, the setting module 1301 may be operable to carry out step 1002, the obtaining module 1302 may be operable to carry out step 1004, and the performing module 1303 may be operable to carry out step 1006. Optionally, the setting module 1301, the obtaining module 1302 and/or the performing module 1303 may be operable to carry out more or less steps to implement the proposed method.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, Random Access Memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method, comprising:
   setting a first control unit to a first operation mode, wherein the first control unit is located on a first antenna path of a first antenna array which has a plurality of antennas, and wherein under the first operation mode of the first control unit, a calibration signal for the first antenna path is isolated from interference;
   setting a second control unit to the first operation mode, wherein the second control unit is located on a second antenna path of the first antenna array, and under the first operation mode of the second control unit, a calibration signal for the second antenna path is isolated from interference;
   obtaining a measurement based at least partly on the calibration signal isolated from the interference for the first antenna path and the calibration signal isolated from the interference for the second antenna path; and
   performing antenna calibration, for the plurality of antennas of the first antenna array, based at least partly on the obtained measurement.

2. The method according to claim 1, wherein the obtained measurement comprises:
   a measurement of the calibration signal for the first antenna path coupled back to the first antenna path; and
   a measurement of the calibration signal for the second antenna path coupled back to the second antenna path.

3. The method according to claim 1, wherein the first antenna array is coupled to a second antenna array, and the second antenna array has a plurality of antennas which have been calibrated, and wherein said method further comprises:

obtaining a measurement of the calibration signal for the first antenna path respectively coupled back to the second antenna path of the first antenna array, third and fourth antenna paths of the second antenna array, wherein the first control unit is under the first operation mode; and performing antenna calibration between the first and second antenna arrays based at least partly on the obtained measurement.

4. The method according to claim 1, wherein at least one of the first and second control units each comprises a switch, and under the first operation mode of the switch, the corresponding antenna path is connected with matched impedance.

5. The method according to claim 4, wherein the switch is located between antenna dipoles and a circulator of the corresponding antenna path.

6. A method for antenna calibration, the method comprising:

setting first and third control units to a first operation mode, wherein the first control unit is located on a first antenna path of a first antenna array having a plurality of antennas which have been calibrated, and under the first operation mode of the first control unit, a calibration signal for the first antenna path is isolated from interference, and wherein the first antenna array is coupled to a second antenna array having a plurality of antennas which have been calibrated, the third control unit is located on a third antenna path of the second antenna array, and under the first operation mode of the third control unit, a calibration signal for the third antenna path is isolated from interference;

setting a second control unit to the first operation mode in response to a failure of the first antenna path, wherein the second control unit is located on a second antenna path of the first antenna array, and under the first operation mode of the second control unit, a calibration signal for the second antenna path is isolated from interference;

obtaining a measurement based at least partly on the calibration signal isolated from the interference for the first antenna path, the calibration signal isolated from the interference for the second antenna path, and the calibration signal isolated from the interference for the third antenna path; and performing antenna calibration between the first and second antenna arrays based at least partly on the obtained measurement.

7. The method according to claim 6, wherein at least one of the calibration of the plurality of antennas of the first antenna array and the calibration of the plurality of antennas of the second antenna array is based at least partly on antenna calibration with a coupler network.

8. The method according to claim 6, wherein the obtained measurement comprises:

a measurement of the calibration signal for the first antenna path respectively coupled back to the second antenna path of the first antenna array, the third antenna path and a fourth antenna path of the second antenna array; and a measurement of the calibration signal for the third antenna path respectively coupled back to the first and second antenna paths of the first antenna array, and the fourth antenna path of the second antenna array.

9. The method according to claim 6, further comprising:

obtaining a measurement of the calibration signal for the second antenna path respectively coupled back to the first antenna path of the first antenna array, the third and a fourth antenna paths of the second antenna array; and performing antenna calibration between the first and second antenna arrays based at least partly on the obtained measurement.

10. The method according to claim 6, further comprising:

setting a fourth control unit to the first operation mode in response to a failure of the third antenna path, wherein the fourth control unit is located on a fourth antenna path of the second antenna array, and under the first operation mode of the fourth control unit, a calibration signal for the fourth antenna path is isolated from interference;

obtaining a measurement of the calibration signal for the fourth antenna path respectively coupled back to the third antenna path of the second antenna array, the first and the second antenna paths of the first antenna array; and performing antenna calibration between the first and second antenna arrays based at least partly on the obtained measurement.

11. The method according to claim 10, wherein at least one of the first, second, third, and fourth control units each comprises a switch, and under the first operation mode of the switch, the corresponding antenna path is connected with matched impedance.

12. The method according to claim 11, wherein the switch is located between antenna dipoles and a circulator of the corresponding antenna path.

13. An antenna apparatus, comprising:

a first antenna array having a plurality of antenna paths;

a first control unit located on a first antenna path of the first antenna array to control calibration interference, wherein under a first operation mode of the first control unit, a calibration signal for the first antenna path is isolated from interference; and a second control unit located on a second antenna path of the first antenna array, wherein under the first operation mode of the second control unit, a calibration signal for the second antenna path is isolated from interference, and wherein a measurement is obtained based at least partly on the calibration signal isolated from the interference for the first antenna path and the calibration signal isolated from the interference for the second antenna path.

14. The antenna apparatus according to claim 13, wherein the first control unit comprises a switch, and under the first operation mode of the switch, the first antenna path is connected with matched impedance.

15. The antenna apparatus according to claim 14, wherein the switch is located between antenna dipoles and a circulator of the first antenna path.

* * * * *